(12) United States Patent
Freel et al.

(10) Patent No.: US 7,199,080 B2
(45) Date of Patent: Apr. 3, 2007

(54) PROCESS FOR PRODUCING ACTIVATED CARBON

(75) Inventors: Barry Freel, Ontario (CA); Gin Liaw, Decatur, IL (US); Cameron Ferguson, Forsyth, IL (US)

(73) Assignees: Ensyn Renewables, Inc., Boston, MA (US); A E Staley Manufacturing Company, Decatur, IL (US)

( * ) Notice: Subject to any disclaimer, the term of this patent is extended or adjusted under 35 U.S.C. 154(b) by 463 days.

(21) Appl. No.: 10/463,030

(22) Filed: Jun. 17, 2003

(65) Prior Publication Data

US 2004/0097369 A1 May 20, 2004

Related U.S. Application Data

(60) Provisional application No. 60/389,478, filed on Jun. 17, 2002.

(51) Int. Cl.
*C01B 31/10* (2006.01)

(52) U.S. Cl. ...................... 502/423; 502/432
(58) Field of Classification Search ............... 502/437, 502/432, 436, 423
See application file for complete search history.

(56) References Cited

U.S. PATENT DOCUMENTS

| | | | |
|---|---|---|---|
| 4,745,015 A * | 5/1988 | Cheng et al. | 428/35.8 |
| 5,187,141 A | 2/1993 | Jha et al. | |
| 5,726,118 A * | 3/1998 | Ivey et al. | 502/417 |
| 5,792,340 A | 8/1998 | Freel et al. | |
| 5,853,548 A | 12/1998 | Piskorz et al. | |
| 5,961,786 A | 10/1999 | Freel et al. | |
| 6,030,922 A | 2/2000 | Khalili et al. | |
| 6,251,822 B1 | 6/2001 | Peng et al. | |

FOREIGN PATENT DOCUMENTS

| | | |
|---|---|---|
| RU | 2124547 C1 | 1/1999 |
| WO | WO 00/00429 | 1/2000 |
| WO | WO 01/49604 A1 | 7/2001 |

OTHER PUBLICATIONS

Rostam-Abadi, M., Chang, R. Chen, S., Lizzio, T., Richardson, C., and Sjostrom, S., 2001, "Final Technical Report: Demonstration Of Sorbent Injection Process For Illinois Coal Mercury Control". Illinois Clean Coal Institute, Project No. 00-1/2.2D-1.*
Chang, C-F., Chang, C-Y., and Tsai, W-T., "Effects of burn-off and activation temperature on preparation of activated carbon from corn cob agrowaste by CO2 and steam", Journal of Colloid and Interface Science, 232, pp. 45-49, (2000).*
Ullmann's Encyclopedia of Industrial Chemistry, "Carbon" Chapter, section 5.3.4.2, Wiley, Jan. 15, 2002. (http://www.mrw.interscience.wiley.com/ueic/articles/a05_095/sect5-fs.html).*
"Corn Refining: The Process, The Products," Corn Refiners Association, Inc., Brochure, 1992.
"Corn Wet Milled Feed Products," Corn Refiners Association, Inc., 3$^{rd}$ Ed., 1989.
"Corn Starch," Corn Refiners Association, Inc., 9$^{th}$ Ed., 1994.

* cited by examiner

*Primary Examiner*—Stuart Hendrickson
(74) *Attorney, Agent, or Firm*—Brinks Hofer Gilson & Lione

(57) ABSTRACT

A method of producing activated carbon comprising the steps of a) pyrolysing corn derivatives to generate char and b) activating the char to produce activated corn carbon.

16 Claims, 2 Drawing Sheets

US 7,199,080 B2

PROCESS FOR PRODUCING ACTIVATED CARBON

This application claims the benefit of U.S. Provisional Application No. 60/389,478, filed Jun. 17, 2002, under 35 U.S.C. § 119(e).

The invention relates to methods of producing activated carbon and to products produced according to the method. More specifically, the present invention relates to a method of producing activated carbon from corn, corn fiber, corn derivatives and corn fiber derivatives and to products produced according to the method.

BACKGROUND OF THE INVENTION

Activated carbon is well-known in the art for its ability to remove impurities from solutions. Further, many processes have been described to produce activated carbon. For example, WO 01/49604 discloses a process for preparing activated carbon from urban waste. The process comprise sorting the waste to remove foreign materials, reducing the size of the waste particles, drying the waste under anaerobic conditions, pyrolysing the waste at a temperature above 110° C. to obtain a powdery charcoal product, agglomerating the charcoal product, carbonizing the agglomerated particles at a temperature above 110° C., activating the agglomerated particles by subjecting the particles to steam and $CO_2$ at a temperature in the range of about 750° C.–900° C., purifying and rinsing the particles in an aqueous acidic solution and subsequently with water, and drying the activated carbon particles. The process allegedly produces activated carbon having a low ash content, high pore volume and improved hardness over other activated carbons known in the art.

RU 2122547 discloses a pyrolytic process that uses agricultural wastes such as straw, corn husks, millet, rice, and cotton to produce activated carbon. Pyrolysis is performed at 650° C. to about 950° C. under a reducing gas atmosphere. Subsequently, the pyrolysis product is treated with steam at a temperature above 500° C. at a steam to material weight ratio of (0.01–0.05):1.

WO 00/00429 discloses a process for preparing activated carbon from urban waste. The process comprises the steps of sorting the waste to remove foreign materials and reducing the size of the waste. The waste is dried under aerobic conditions at a temperature of about 100–150° C. and partially pyrolyzed at a temperature of about 140–400° C. The product is subsequently granulated and the granules are carbonized under anaerobic conditions at a temperature of about 120–500° C. Subsequently, the granules are activated by steam and combustion gasses at 750–900° C. Finally, the activated granules are purified by rinsing in aqueous HCL solution and dried.

U.S. Pat. No. 6,251,822 discloses a method of making activated carbon of various pore size distributions. The method comprises carbonizing activated pitch, wherein the softening point of the pitch is less than about 250° C. and activating the pitch to produce activated carbon. The patent also teaches that a catalyst metal may be employed to produce mesoporosity in the activated carbon.

U.S. Pat. No. 6,030,922 discloses synthesizing activated carbon from sludge such as biosolids. The treated material is subjected to chemical activation, light and humidity treatment, pyrolysis and physical activation to produce an activated carbon having a high surface area and microporosity.

Although the all of the documents referred to above disclose a method of producing activated carbon, the products produced by these products will differ widely in terms of their physical structure and absorption characteristics, as these characteristics are dependent on the type of starting material and its condition, and the processing conditions which are employed to produce activated carbon. Thus, the activated carbons may exhibit marked variation in their hardness, ash content, porosity, and binding/absorption capacity. Further, variations in binding/absoprtion capacity may be observed for one or more specific compounds or elements.

There is a need in the art for novel methods of producing useable products such as activated carbon from corn derivatives and from waste by-product streams such as corn fiber and other corn derivatives.

It is an object of the present invention to overcome disadvantages of the prior art.

The above object is met by a combination of the features of the main claims. The sub claims disclose further advantageous embodiments of the invention.

SUMMARY OF THE INVENTION

The invention relates to methods of producing activated carbon and to products produced according to the method. More specifically, the present invention relates to a method of producing activated carbon from corn, corn fiber, corn derivatives and corn fiber derivatives and to products produced according to the method.

According to the present invention there is provided a method of producing activated corn carbon comprising the steps of a) pyrolysing corn derivatives to produce char and b) activating char to produce activated corn carbon.

The method of the present invention as defined above may comprise the steps of
  a) pyrolysing corn derivatives at a temperature of between about 460° C. and about 560° C. for a duration of about 0.03 to about 2 seconds to produce char, and;
  b) activating the char using steam at a temperature of between about 500° C. to about 1000° C. and a steam to carbon ratio of about 0.4:1 to about 7:1 for a duration of between about 10 to about 90 minutes, to produce activated corn carbon.

In an embodiment of the present invention which is not to be considered limiting, the pyrolysis is performed for a duration of about 0.7 seconds, and the steam is at a temperature of about 800° C. to about 1000° C. Preferably, the steam to carbon ratio is about 0.4:1 to about 1.7:1 and the duration of activating is between about 30 to about 90 minutes.

Also provided by the present invention as defined above, the corn derivatives may comprise corn kernels, off grade corn kernels, corn cobs, corn fiber, corn hulls, corn stover, corn steep liquor, gluten, starch or any combination thereof. For example, but not to be considered limiting, the corn derivative may comprise a dried mixture of corn steep liquor and corn fiber produced during, but not limited to, the wet milling of corn. However, any corn product whether natural or processed may be employed in the method of the present invention.

Also provided by the present invention is a method of producing activated carbon comprising the steps of
  a) pyrolysing corn derivatives at a temperature of between about 350° C. and about 560° C. for a duration of about 0.3 seconds to about 2 minutes to produce char, and;
  b) activating the char using steam at a temperature of between about 500° C. to about 1000° C. and a steam to carbon ratio of about 0.4:1 to about 7:1 for a duration of between about 10 to about 90 minutes, to produce activated carbon. The pyrolysis process employed in such a method may be considered a slow pyrolysis process, and such processes are meant to be encompassed in the method of the present invention.

Further, according to the method of the present invention as defined above, the char, activated corn carbon, or both may be optionally acid washed in a solution comprising hydrochloric, sulfuric, nitric, acetic, formic or pyroligneous acid. Preferably, the acidic solution comprises between about 0.2 to about 5% (v/v) acid. Following acid washing the char or activated carbon or both may be subjected to a dewetting process, such as, but not limited to centrifugation, vacuum drum, filtering or a combination thereof. Further, the char, activated corn carbon or both may be rinsed with water.

Also provided by the present invention is an activated carbon produced according to the method as defined above. The activated carbon may comprise one or more of the following characteristics:

(a) an iodine number between about 200 and about 1200, preferably about 600 and about 1200, more preferably about 800 and about 1200 and;

(b) a BET number between about 200 and about 1200, preferably about 600 and about 1200, more preferably about 800 and about 1200.

Also provided by the present invention is a method of removing one or more impurities from a mixture comprising the steps of:

a) contacting the mixture with activated corn carbon produced according to the method as defined above to produce a partially purified mixture, and;

b) isolating the partially purified mixture from the one or more impurities.

The mixture may be, but is not limited to a solution or a gas mixture, and the one or more impurities may comprise one or more proteins, color pigments, small molecules, minerals, or a combination thereof. The small molecules may comprise, but are not limited to HMF, furfural or a combination thereof. Further, the minerals may comprise, but are not limited to calcium, magnesium, sodium, potassium, iron, copper, silicon, manganese, zinc, phosphorus, sulfur, chlorine or a combination thereof.

The present invention also provides a method as defined above which is part of a process such as, but not limited to, water purification process, ground water remediation process, air purification process, sugar and syrup decolorization process, waste water purification process, air pollution control process, or combination thereof.

Also provided by the present invention, the method as defined above may further comprise a pelletization step wherein the char or activated corn carbon is mixed with a binder such as, but not limited to starch, molasses, coal tar, natural resin, wood-based natural resin, corn based natural resin or a combination thereof.

This summary does not necessarily describe all necessary features of the invention but that the invention may also reside in a sub-combination of the described features.

BRIEF DESCRIPTION OF THE DRAWINGS

These and other features of the invention will become more apparent from the following description in which reference is made to the appended drawings wherein.

DESCRIPTION OF PREFERRED EMBODIMENT

The invention relates to methods of producing activated carbon and to products produced according to the method. More specifically, the present invention relates to a method of producing activated carbon from corn, corn fiber, corn derivatives and corn fiber derivatives and to products produced according to the method.

According to the present invention, there is provided a method of producing activated carbon from corn derivatives. The method comprises the steps of a) pyrolysing corn derivatives to produce char and b) activating char to produce activated corn carbon. Other processing steps may also be present before, or after the steps of pyrolysing, activating or both. For example, but not wishing to be limiting, the char may be acid-washed after the step of pyrolysing and prior to activation, or the activated corn carbon may be acid-washed after the step of activating. Further, both the char and the activated corn carbon may be acid washed in the method of the present invention.

Figure 1A:
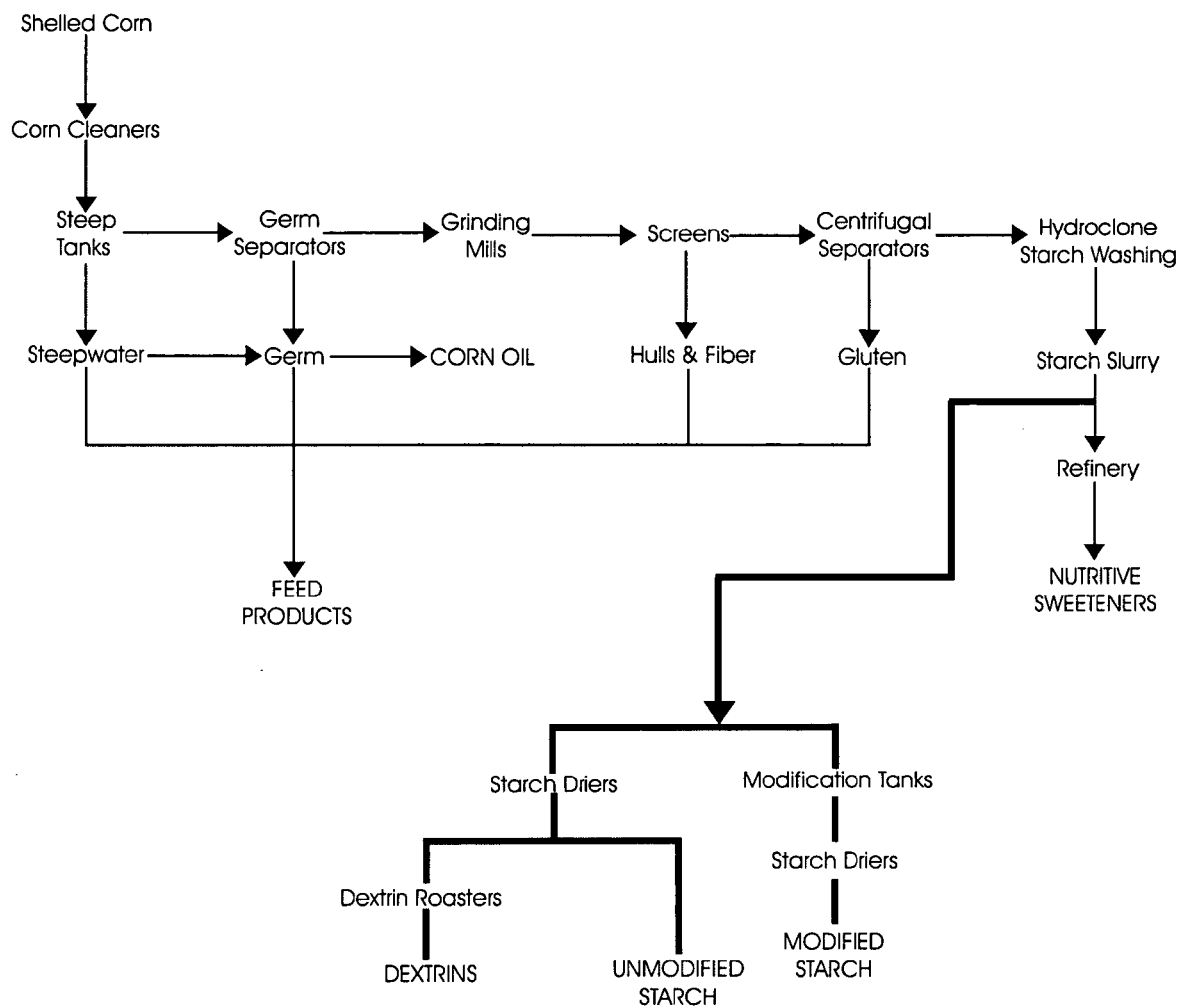
FIG. 1A shows a flow diagram of a typical corn wet milling process.
Figure 1B:
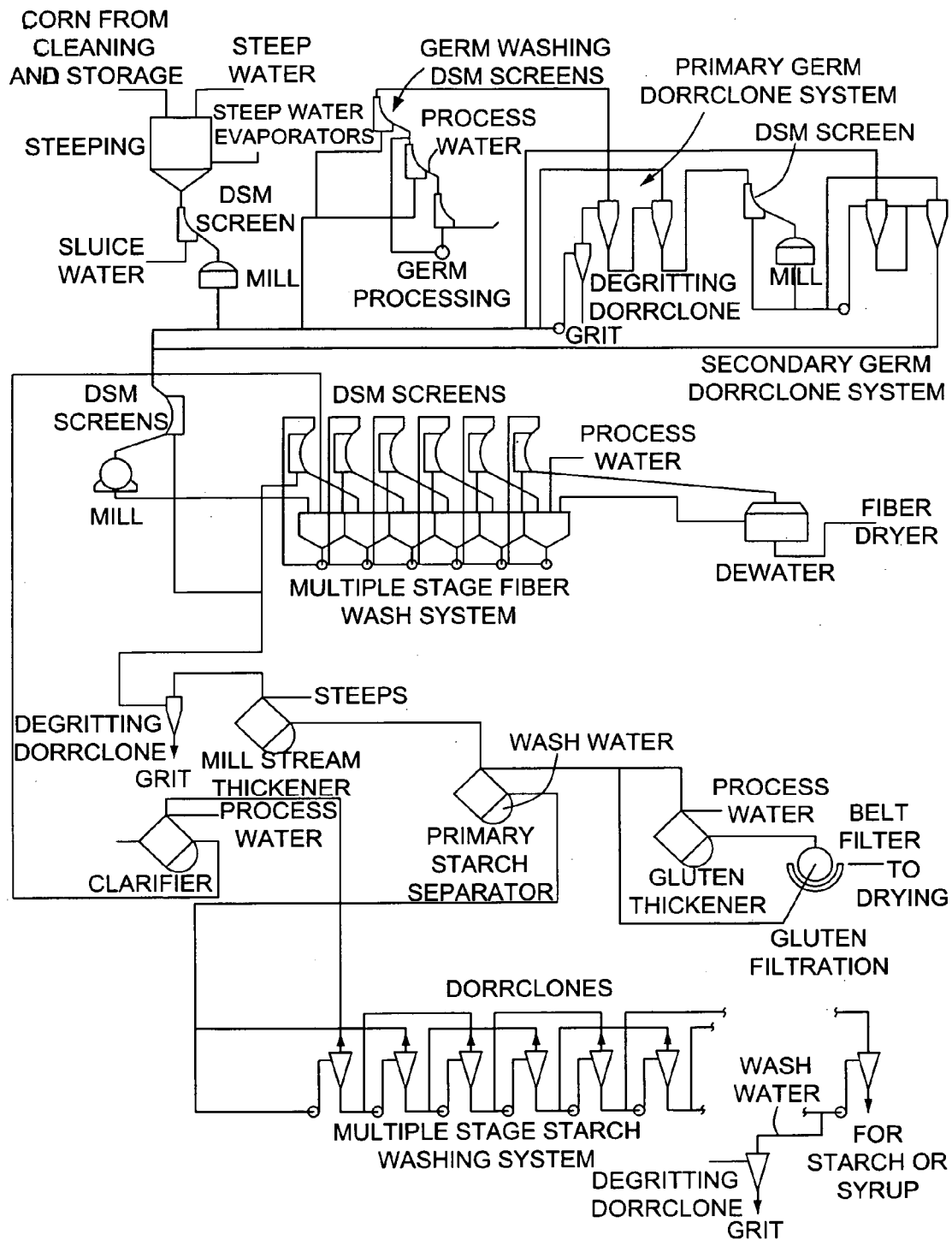
FIG. 1B shows a flow diagram for the isolation of corn fiber and other corn components from a wet milling process.

By the term "corn derivative" it is meant any product derived from corn, for example, but not limited to corn kernels, off grade corn kernels, corn cobs, corn fiber, corn hulls, corn stover, corn steep liquor, gluten, starch or any combination thereof. Further, corn derivative is meant to comprise products derived from corn in their natural state as well as products that may be partially or wholly processed, for example, but not limited to corn products produced during the wet milling of corn as described in Corn Starch 9th Edition Copyright 1994 Corn Refiners Association, Inc and Corn Wet Milled Feed Products, 3rd Edition Copyright 1989, Corn Refiners Association, Inc., which are herein incorporated by reference. An example, not meant to be limiting, of a corn wet milling process is shown in FIG. 1A. Corn derivatives that are produced during wet milling may be processed and isolated as shown in FIG. 1B (from Corn Chemistry and Technology by Stanley A. Watson and Paul Ramstad, published by the American Association of Cereal Chemists Inc, which is herein incorporated by reference). However, these figures are not meant to limit the invention as described herein in any manner as a variety of methods of obtaining corn derivatives are known in the art and these methods are fully contemplated by the present invention. In a nonlimiting embodiment of the present invention, corn derivatives such as corn starch may be used independently or with filler. In an alternate embodiment which is not meant to be considered limiting, corn derivatives may comprise a dried mixture of corn steep liquor and corn fiber produced during the wet milling of corn. In such a manner, the present invention may be employed to recycle waste products produced from a process, such as, but not limited to a wet milling process.

The corn derivatives that are employed in the method of the present invention preferably comprise a moisture content of between about 0.4 to 10 wt %, more preferably between about 4 to 10 wt %, still more preferably about 5 to 7 wt %. Methods of determining the moisture content of such products are well known in the art and may be easily practiced by a person of skill in the art. Further, a person of skill in the art will recognize that corn derivatives comprising a moisture content above a preferred range may be dried using conventional methods known in the art to reduce the moisture content of the derivatives. Also, the corn derivatives may further comprise additional characteristics, for example, but not limited to one or more of the characteristics listed in Example 1, Table 5. However, the method of the present invention also contemplates using corn derivatives with characteristics that are different from any one or all of the characteristics shown in Example 1, Table 5.

The corn derivatives may be pyrolysed using any pyrolysis process known in the art. Without wishing to be limiting, an example of a pyrolysis process that may be employed by the method of the present invention is described in U.S. Pat. No. 5,792,340 which refers to rapid thermal processing of feedstocks. Alternatively, slow pyrolysis may be employed in the method of the present invention, for example, but not limited to the rotary kiln method of Calciner, which is herein incorporated by reference. In an embodiment of the present invention, the corn derivative is pyrolysed at a temperature of between about 460° C. and about 560° C. for a duration of about 0.03 to about 2 seconds, preferably about 0.7 seconds. Further, the pyrolysis process may be performed in any reactor, for example, but not limited to a sand transport reactor or a fluidized bed reactor as described in U.S. Pat. Nos. 5,792,340; 5,853,548; and 5,961,786 which are herein incorporated by reference. The solid char which is produced by the pyrolysis of corn derivatives may be activated to produce activated corn carbon, while the liquid product produced by pyrolysis may be used as a bio-oil or pitch for a variety of purposes including, but not limited to heating oil, diesel oil, or natural resin. Further, the char may be mixed with a natural resin binder to enable pelletization of the activated corn carbon. In an alternate embodiment, the solid char may be used as a fuel source.

The process disclosed in U.S. Pat. No. 5,792,340 (which is herein incorporated by reference) involves fast thermal processing (such as fast pyrolysis, rapid cracking) of carbonaceous materials (feedstock) using rapid mixing and heat transfer. The heat is transferred to the feedstock from hot inorganic particulate solids which are accelerated and then injected into the reactor through one or several streams, and impinge on one or several feedstock streams. The mixing section therefore combines the hot inorganic particulate solids and carbonaceous feedstock in a dense turbulent central stream in the mixing zone. Solids are accelerated at the base of and throughout the mixing zone to enhance turbulence and mixing. A distinct, turbulent, mixing zone achieves extremely rapid, effective mixing of an inorganic particulate feedstock with a solid inorganic particulate heat carrier and a non-oxidative transport gas. Direct turbulent contact between the solid heat carrier and the feedstock provides very high heat transfer rates and effective particle ablation which are required for depolymerization and devolatilization reactions that provide maximum total liquid yields.

Without wishing to be limiting in any manner, rapid thermal processing involves:

a) introducing a primary stream of carbonaceous material and a secondary stream of upwardly flowing inorganic particulate heat supplying material into a mixing section in the relative absence of oxygen, the ratio of the mass of inorganic heat supplying material: mass of carbonaceous feedstock from about 12:1 to about 200:1;

b) maintaining the stream of carbonaceous material in contact with the secondary stream of heat supplying material through the reactor section to cause transformation of the carbonaceous material to a product stream;

c) separating the product stream from the heat supplying material by separation means at the exit of the reactor section such that the average residence time of contact between the carbonaceous material and the heat supply material is less than 2.0 seconds and the temperature of the products is reduced after exiting from the reactor section to less than 300° C. in less than 0.1 seconds; and d) recycling the heat supplying material to the mixing section.

The inorganic particulate heat supplying material may be sand, sand and catalytic solids, alumina-silica catalyst or other inorganic catalyst; the ratio of the mass of inorganic heat supplying material: mass of carbonaceous feedstock is between about 12:1 and about 200:1, the heating rate of the carbonaceous material in the mixing section and reactor section is greater than 1000° C. per second; the average residence time of the carbonaceous material and the primary products in the mixing section and reactor section is between 0.03 and 1.8 seconds, the temperature in the reaction section is between 350° C. and 1000° C., the rate of carbonaceous material reaction (biomass throughput) is greater than 800 lb/hr sq. ft. of reactor cross-section, the product stream liquid yield from wood or wood-derived biomass is greater than 65 wt %. Other rapid thermal processes as described within the '340 patent may also be employed in the pyrolysis step of the present invention. Further, slow pyrolysis processes may also be employed in the method of the present invention.

Activation of the corn char may be performed by any activation process known in the art, for example, but not limited to, as described in WO 01/49604, WO 00/00429, U.S. Pat. Nos. 6,251,882 and 6,030,922, which are herein incorporated by reference. In an embodiment of the present invention, the corn char is activated by steam at a temperature between about 500° C. and about 1000° C., preferably about 800° C. and about 950° C. using a steam:carbon ratio of about 0.4:1 to about 5:1, preferably about 0.4:1 to about 1.7:1 for a duration of about 10 to about 90 minutes, preferably about 30 to about 90 minutes. Other conditions may include activation at temperatures between about 500° C. to about 1000° C. or between about 800° C. to about 1000° C. The product produced by the activation of the char is activated corn carbon.

The char produced from pyrolysis of corn derivatives may be optionally acid-washed after pyrolysis and before activation in an acidic solution such as, but not limited to hydrochloric, sulfuric, nitric acid, acetic, formic or pyroligneous acid solution. Similarly, the activated corn carbon may be optionally acid-washed in the same manner. In an embodiment of the present invention, which is not meant to be limiting, the char produced via pyrolysis, or the corn carbon produced by activation may be acid washed while it is at a temperature in the range of about 100 to 200° C. In an alternate embodiment, the char, corn carbon or both may washed at room temperature. The acidic solution may comprise between about 0.2% (v/v) to about 5% (v/v) acid in water. In an embodiment of the present invention, the acidic solution comprises between about 1% to about 5% (v/v) HCl or other acid in water. However, acidic solutions outside this range are also contemplated by the present invention. Preferably, the water is substantially pure, that is, it contains low levels of impurities. Examples of such water include distilled, deionized or both distilled and deionized water.

After the char or activated corn carbon is acid-washed, it is dewetted by any process that is known in the art, for example, but not limited to filtering, vacuum drum, centrifugation or the like. Without wishing to be bound by theory, acid-washing of the char, activated corn carbon or both may reduce or remove undesired inorganic components. Further acid-washing may adjust the pH of the char, activated corn carbon or both.

Activated corn carbon samples produced according to the method of the present invention were tested to determine their iodine number and for their ability to remove protein, colour and HMF from a variety of test solutions. The results of the tests are shown in Tables 1, 2, and 3 below.

TABLE 1

Protein Removal by Activated Corn Carbon Produced According to the Method of the Present Invention

| | Protein Removal Sample 1 (+1% HCL acid wash) | Protein Removal Sample 2 (+5% HCL acid wash) |
|---|---|---|
| | Iodine number | |
| Treatment Level[1] | 722 % Removal | 743 % Removal |
| 0.00% | — | — |
| 0.10% | 11 | 12 |
| 0.25% | 18 | 17 |
| 0.5% | 24 | 23 |
| 1.00% | 27 | 25 |
| 1.50% | 29 | 27 |

Table Footnote:
[1]treatment levels refer to the amount of carbon used per syrup. For example, a treatment level of 1% employs 1% activated corn carbon to 99% syrup.

TABLE 2

Color Removal by Activated Corn Carbon Produced According to the Method of the Present Invention

| | Color Removal Sample 1 (+1% HCL acid wash) | Color Removal Sample 1 (+5% HCL acid wash) | Color Removal Sample 1 (+5% Sulfuric acid wash) | Color Removal Virgin Sample |
|---|---|---|---|---|
| | Iodine number | | | |
| Treatment Level | 722 % Removal | 743 % Removal | 1000 % Removal | 1000 % Removal |
| 0.00% | — | — | — | — |
| 0.10% | 34 | 21 | 48 | 55 |
| 0.25% | 44 | 27 | 75 | 80 |
| 0.50% | 52 | 44 | 87 | 89 |
| 1.00% | 64 | 54 | 92 | 94 |
| 1.50% | 67 | 57 | 93 | 97 |
| pH[1] | 4.2 | 3.9 | — | — |

Table Footnote:
[1]pH refers to the pH of the syrup after treatment

TABLE 3

HMF Removal by Activated Corn Carbon Produced According to the Method of the Present Invention

| Treatment level | HMF Removal Sample 1 (+1% HCL acid wash) % Removal | HMF Removal Sample 2 (+5% HCl acid wash) % Removal |
|---|---|---|
| 0.00% | — | — |
| 0.10% | 41 | 35 |
| 0.25% | 78 | 67 |
| 0.5% | 87 | 82 |

TABLE 3-continued

HMF Removal by Activated Corn Carbon Produced According to the Method of the Present Invention

| Treatment level | HMF Removal Sample 1 (+1% HCL acid wash) % Removal | HMF Removal Sample 2 (+5% HCl acid wash) % Removal |
|---|---|---|
| 1.00% | 93 | 92 |
| 1.50% | 94 | 99 |

As indicated by the results shown in Tables 1, 2 and 3, activated corn carbon produced according to the method of the present invention may be characterized by an iodine number between about 200 and about 1200, preferably about 800 and 1200, more preferably about 900 and 1200. Further, in two of the samples, the pH of the syrup following treatment is between about 3.9 and 4.2. Also, as shown by the table listing results regarding protein removal, the activated corn carbon is capable of removing between about 10% and about 30% of proteins for treatment conditions of between 0.10% and 1.50% as employed herein. Thus, the activated corn carbon samples of the present invention may be used to remove protein from a variety of solutions.

The results listed in Tables 2 and 3 further indicate that the activated corn carbon samples of the present invention may be employed to remove color and/or small molecules such as HMF and the like from solutions. Thus, the activated corn carbon produced by the method of the present invention may be employed to improve syrup color and reduce or remove undesirable components, such as protein, HMF and small molecules from solution.

Samples of activated corn carbon produced according to the method of the present invention were compared to other activated carbon samples known in the art. Referring now to Table 4, there is shown results of tests comparing the activated carbon sample produced according to the method of the present invention and CarboChem DC 50 (GAC) and Norit (PAC) activated carbons known in the art.

TABLE 4

Comparison of Activated Corn Carbon (ACC) produced according to the method of the present invention versus powdered and granular activated carbons known in the art.

| Impurity Measured | CarboChem DC (GAC) | Norit (PAC) | ACC (1% HCl[1]) | ACC (5% HCl[1]) |
|---|---|---|---|---|
| Color Abs. (415 nm) | 0.113 | 0.04 | 0.296 | 0.217 |
| HMF (ppm) | 1.09 | 0.35 | 0.19 | 0.17 |
| Furfural (ppm) | <0.05 | <0.05 | <0.02 | <0.02 |
| Protein (ppm) | 150 | 138 | 109 | 106 |
| Sodium | 308.96 | 296.1 | 234.07 | 235.01 |
| Copper | 0.04 | 0.05 | 0.03 | 0.03 |
| Silicon | 12.52 | 12.64 | 9.56 | 9.4 |
| Silicon-total | 14.82 | 11.93 | 10.7 | 10.8 |
| Zinc | 0.52 | 0.58 | 0.47 | 0.64 |
| Phosphorus | 26.28 | 26.9 | 23.41 | 21.08 |
| Sulfur | 158.4 | 135.88 | 101.89 | 101.22 |

Table footnote:
Protocols employed 1% carbon use to 99% syrup. The lower the value reported, the more efficient the removal.
[1]Indicates that the samples tested were acid washed following pyrolysis as described in the Examples. Color was measured by BRA (Corn Refiners Association) approved spectrophotometer at 450 mu wavelength. HMF and furfural were measured by HPLC method. Protein was measured by Antek combustion method. Metals were measured by ICP for metals method.

As shown by the results of Table 4, the corn carbon samples produced according to the method of the present invention were comparable or outperformed powdered and granular activated carbon samples known in the art, with respect to the removal of specific impurities. Without wishing to be limiting in any manner, the activated carbon product of the present invention exhibited increased HMF removal, protein removal and mineral removal.

The present invention also contemplates activated corn carbon produced using rapid thermal processing or slow pyrolysis, wherein the activated corn carbon exhibits characteristics as defined above. The present invention also provides activated corn carbon samples that are characterized as having an adsorption value (iodine number) of between about 200 and about 1200 mg/g, preferably about 600 to about 1200 mg/g, more preferably about 800 to about 1200 mg/g and a pH value of about 4.5 to about 5.5. Further, the activated corn carbon may be characterized as having a BET number between about 200 to about 1200, preferably about 600 to about 1200, more preferably about 800 to about 1200. The BET number reflects the extent of the pore surface area within the matrix of an activated carbon and may be employed as a preliminary indicator of the activity level, based on the principle that the greater the surface area, the higher the number of absorptive sites available. Methods for calculating the BET number are well known in the art, and can easily be determined by a person of skill in the art.

The activated corn carbon that is produced in accordance with the method of the present invention may be processed into granular, powdered or pelleted formulations. For example, but not to be limiting in any manner, the activated carbon may be mixed with a resin or binder, such as, but not limited to a starch, molasses, or wood based natural resin as is known in the art, or corn-based natural resin produced by the pyrolysis processes as described herein. Such mixtures may permit pelletization of activated corn carbon of the present invention.

Without wishing to be limiting, the activated corn carbon of the present invention may be employed in the filtration of liquids or gases. As disclosed herein, the activated corn carbon removes impurities, such as, but not limited to proteins, color pigments, small molecules such as HMF, furfural and the like, and minerals, such as but not limited to calcium, magnesium, sodium, potassium, iron, copper, silicon, manganese, zinc, phosphorus, sulfur, chlorine, etc. Specifically, but not to be considered limiting, the activated corn carbon maybe used for sugar and syrup decolorization, water purification, ground remediation, waste water purification, air purification, air pollution control, gas and vapor adsorption or any combination thereof. Further, the activated carbon produced according to the present invention may be employed in other processes known in the art.

The following description is of a preferred embodiment by way of example only and without limitation to the combination of features necessary for carrying the invention into effect.

The above description is not intended to limit the claimed invention in any manner. Furthermore, the discussed combination of features might not be absolutely necessary for the inventive solution.

The present invention will be further illustrated in the following examples. However, it is to be understood that these examples are for illustrative purposes only, and should not be used to limit the scope of the present invention in any manner.

EXAMPLES

Example 1

Characteristics of Corn Derivatives Employed in Pyrolysis

The corn fiber and corn gluten feed (examples of corn derivatives) used for pyrolysis are dried to comprise about 5% to about 7% moisture by weight. Analysis of the corn fiber and corn gluten feed indicated characteristics as shown in Table 5.

TABLE 5

Representative Characteristics of Corn Fiber and Corn Gluten Feed Determined Prior to Pyrolysis

| Characteristic | Value |
| --- | --- |
| Bulk Density 25° C. (kg/m$^3$)[1] | about 100–400 |
| Moisture Content (wt %)[2] | about 0.4–7.1 |
| Ash Content (wt %)[3] | about 0.5–0.6 |
| Lignin (wt %)[4] | about 2.7 |
| Cellulose (wt %)[5] | about 35.8 |
| Hemicellulose (wt %)[5] | about 35.9 |
| Wood Extractives (wt %)[6] | about 3.4 |
| Carbohydrate (wt %)[5] | about 71.7 |
| Carbon (wt %)[7] | about 45.45 |
| Hydrogen (wt %)[7] | about 6.48 |
| Nitrogen (wt %)[7] | about 1.54 |
| Sulfur (wt %)[8] | about 0.2 |
| U.S. Sieve # +1/4–14 (wt %)[9] | about 0–83 |
| U.S. Sieve # +14–35 (wt %)[9] | about 16–100 |
| U.S. Sieve # +35–50 (wt %)[9] | about 0–29 |

Table Footnotes:
[1] American Society for Tests and Materials (ASTM D1298-85);
[2] ASTM D3173;
[3] ASTM D3174;
[4] Pulp and Paper Technical Association of Canada (PAPTAC) J8 J9;
[5] Technical Association of the Pulp and Paper Industry (TAPPI) T 249;
[6] TAPPI 264;
[7] ASTM D 5291;
[8] ASTM 5142;
[9] ASTM 5709.

Example 2

Parameters for Pyrolysis of Corn Derivatives

Pyrolysis of corn derivatives may be performed in a sand bed reactor or a fluidized bed reactor, for example, but not limited to as described in U.S. Pat. Nos. 5,792,271; 5,961,786; and 5,853,548; which are herein incorporated by reference. Pyrolysis was performed at a temperature of between about 460° C. to about 560° C. for a duration of about 700 milliseconds and a condensing temperature of between about 46° C. and 100° C., preferably about 50° C. and 100 ° C. The pyrolysis process yields about 73% liquid and between about 7% and about 14% char by weight.

Corn derivatives pyrolysed according to the processing conditions described above yielded about 73 wt %, but may yield in excess of 75% in industrial processes. The non-optimized maximum concentration of the 7 most predominant chemical compounds in the liquid product was about 33 wt %. Without wishing to be bound by theory, this is equivalent to a yield of about 24% of the pre-pyrolized corn derivatives if a liquid yield of about 73% is assumed. The yield of hydroxyacetaldehyde (HA), a chemical indicator, was about 7.5 wt % of the corn derivatives (about 10 wt % of the liquid) and the yield of levoglucosan was about 6 wt % (7.7 wt % of the liquid).

Products produced by Pyrolysis Conditions as defined above are shown in Table 6.

TABLE 6

Product Yields Produced from Pyrolysis Operating Conditions

| Liquid (as fed) | Liquid (maf) | Gas (as fed[1]) | Gas (maf[2]) | Char (as fed) | Char (maf) | Total recovery (as fed) | Total recovery (maf) |
|---|---|---|---|---|---|---|---|
| 70.8–72.7 | 69.3–71.5 | 10–16.6 | 10.5–17.4 | 7.2–13.5 | 7.2–13.5 | 93.4–97.2 | 93.1–97.8 |

Table footnote
[1]As fed refers to the condition of the corn derivatives fed into the rapid thermal processing reactor system and corresponds to about 5–7 wt % water and about 0.75 to 1.0 wt % ash.
[2]maf refers to moisture/ash free wherein the moisture and ash are mathematically removed from the feedstock to determine the effect of only the organic content of the feed.

Char yields were in the range of about 7 to about 13 wt % of the feed material. Further analysis of the char produced by pyrolysis indicated a heating value of between about 27 and about 28 MJ/kg. This suggests that the char may be used as a fuel or upgraded to activated carbon by activating the char.

Example 3

Activation of Char Produced from Pyrolysis

Char produced from the pyrolysis of corn derivatives was activated according to numerous process conditions as shown in Table 7.

TABLE 7

Activation Conditions for the Production of Activated Carbon

| Sample # | Char Feedstock* | Avg. reactor temperature (° C.) | Steam:Carbon Ratio | Residence Time (minutes) |
|---|---|---|---|---|
| 18 | a | 880 | 1.7:1 | 90 |
| 19 | a | 804 | 0.4:1 | 30 |
| 20 | a | 822 | 0.4:1 | 30 |
| 21 | a | 807 | 0.4:1 | 60 |
| 22 | a | 839 | 0.4:1 | 60 |
| 23 | b | 802 | 0.7:1 | 60 |
| 24 | b | 845 | 0.6:1 | 60 |

*(a) refers to pyrolysed corn char that is subsequently activated; (b) refers to pyrolysed corn char that is treated by acid wash flotation as described in Example 4 and subsequently activated as described above.

Table 7 shows representative conditions employed to activate pyrolysed corn char. Table 7 is not meant to be limiting in any manner and variations of the reactor temperature, steam:carbon ratio and residence time, alone or in any combination from the values listed are also meant to be encompassed by the present invention.

Example 4

Acid Wash Flotation of Corn Char

Char from pyrolysis of corn derivatives is obtained as described in Example 2. A known amount of char is combined with 1% or 5% (v/v) HCl in water in a 1:1 weight ratio, and mixed with a drill for between 2 to 3 minutes. The mixed char is allowed to settle overnight (about 16 hours) and subsequently filtered through a Whatman #40 filter paper and rinsed with about 500 ml of distilled water. The rinsed char is dried until the char exhibits a water content of less than about 5% by weight. The acid-washed char may the be activated, for example, but not limited to, as outlined in Example 3.

All references cited above are herein incorporated by reference.

The present invention has been described with regard to preferred embodiments. However, it will be obvious to persons skilled in the art that a number of variations and modifications can be made without departing from the scope of the invention as described herein.

The embodiments of the invention in which an exclusive property of privilege is claimed are defined as follows:

1. A method of producing activated carbon comprising the steps of:
   a) pyrolysing corn derivatives in the presence of an inorganic particulate heat supplying material at a temperature of between about 460° C. to about 560° C. and a weight ratio of the inorganic heat supplying material to the corn derivatives from about 12:1 to about 200:1, for a duration of about 0.03 to about 2 seconds, to produce char, and
   b) activating said char using steam at a temperature of between about 500° C. to about 1000° C. and a steam to carbon ratio of about 0.4:1 to about 7:1 for a duration of between about 10 to about 90 minutes, to produce activated carbon.

2. The method of claim 1, further comprising a pelletization step wherein said char is mixed with a binder selected from the group consisting of starch, molasses, coal tar, natural resin, wood based natural resin, corn based natural resin or a combination thereof.

3. The method of claim 1, wherein said pyrolysis is performed for a duration of about 0.7 seconds.

4. The method of claim 1, wherein said steam is at a temperature of about 800° C. to about 1000° C.

5. The method of claim 1, wherein said steam to carbon ratio is about 0.4:1 to about 1.7:1.

6. The method of claim 1, wherein said activating comprises a duration of between 30 to about 90 minutes.

7. The method of claim 1, wherein said corn derivatives comprise corn kernels, off grade corn kernels, corn cobs, corn fiber, corn hulls, corn stover, corn steep liquor, gluten, starch or any combination thereof.

8. The method of claim 7, wherein said corn derivative comprises a dried mixture of corn steep liquor and corn fiber produced during the wet milling of corn.

9. A method of producing activated carbon comprising the steps of:
   a) pyrolysing corn derivatives in the presence of an inorganic particulate heat supplying material at a temperature of between about 350° C. to about 560° C. and a weight ratio of the inorganic heat supplying material to the corn derivatives from about 12:1 to about 200:1, for a duration of about 0.3 seconds to about 2 minutes, to produce char, and
   b) activating said char using steam at a temperature of between about 500° C. to about 1000° C. and a steam to carbon ratio of about 0.4:1 to about 7:1 for a duration of between about 10 to about 90 minutes, to produce activated carbon.

10. The method of claim 9, wherein said char, activated carbon, or both are acid-washed.

11. The method of claim 10, wherein said acid wash comprises soaking in an acidic solution followed by dewetting.

12. The method of claim 11, wherein said acidic solution comprises hydrochloric, sulfuric, nitric, acetic, formic or pyroligneous acid solution.

13. The method of claim 12, wherein said solution comprises between about 0.2 to about 5% (v/v) acid.

14. The method of claim 13, wherein said acid is hydrochloric acid, sulfuric acid or a combination thereof.

15. The method of claim 11, wherein said dewetting is performed by centrifugation, vacuum drum, filtering or a combination thereof.

16. The method of claim 11, wherein said acid wash is followed by rinsing with water.

* * * * *